US008034424B2

(12) United States Patent
Smith et al.

(10) Patent No.: US 8,034,424 B2
(45) Date of Patent: Oct. 11, 2011

(54) SHOP HORSE PAD

(76) Inventors: Ralph E. Smith, Virginia Beach, VA (US); Harry C. Smith, Powell, TN (US)

( * ) Notice: Subject to any disclaimer, the term of this patent is extended or adjusted under 35 U.S.C. 154(b) by 47 days.

(21) Appl. No.: 12/798,886

(22) Filed: Apr. 12, 2010

(65) Prior Publication Data

US 2010/0196634 A1 Aug. 5, 2010

(51) Int. Cl.

| | |
|---|---|
| ***B29D 22/00*** | (2006.01) |
| ***B29D 23/00*** | (2006.01) |
| ***B32B 1/08*** | (2006.01) |
| ***B65D 39/00*** | (2006.01) |

(52) U.S. Cl. .................. 428/36.5; 428/36.9; 428/36.92; 428/40.1; 428/41.7; 428/41.8; 248/164; 248/431; 248/432; 248/163.1

(58) Field of Classification Search ................ 428/36.5, 428/36.9, 36.92, 40.1, 41.7, 41.8; 248/164, 248/431, 432, 163.1
See application file for complete search history.

(56) References Cited

U.S. PATENT DOCUMENTS 3,157,136 A * 11/1964 Moody ........................ 108/155
6,315,759 B1 * 11/2001 Peterson ...................... 604/171

* cited by examiner

*Primary Examiner* — Michael C Miggins
(74) *Attorney, Agent, or Firm* — Bradley D. Goldizen

(57) ABSTRACT

A shop horse pad of closed cell foam is cylindrical in shape and having a central radial opening provided therein. An axial slit is provided along the length of the pad that creates two axial edges. A strip of adhesive is arranged along at least one of the axial edges. A covering strip, of preferably cellophane, is provided on the strip of adhesive such that when it is removed, the two axial edges adhere together. In this manner, a user may simply force the pad over the horizontal work tubing of the shop horse and removes the covering strip. Thereafter, the axial edges of the pad are forced together to form a solid pad about the exterior of the horizontal tubing.

20 Claims, 10 Drawing Sheets

SHOP HORSE PAD

The present application claims priority from U.S. Provisional Patent Application Ser. No. 60/899,938 filed on Feb. 7, 2007 as well as Non-provisional application Ser. No. 11/980, 278 filed on Oct. 30, 2007.

The subject matter of the present invention did not receive federal government research and development funding.

BACKGROUND OF THE INVENTION

Generally, the invention relates to a pad for use with a shop horse in automotive repair shops, paint shops, and other types of repair businesses. More particularly, the invention is a foam pad that rests atop a working portion of a tube that forms a shop horse for preventing damage to parts that are rested upon the shop horse.

A shop horse is portable stand or bench having a horizontal surface, such as tubing, that rests atop a plurality of legs. The horizontal surface serves as an upper working surface upon which parts are rested. The shop horse typically comprises two pieces of u-shaped tubing that are coupled together to form a pair of legs on opposite sides of the pair of upper working surfaces of the shop horse. Each piece of u-shaped tubing includes a vertical leg each leg includes a rubber tip that engages a floor surface. A protective pad or cover is provided on the horizontal portion of the tubing. This horizontal portion of the tubing forms the working portion of the shop horse and the protective pad prevents damage to any articles that are rested on the shop horse. Mechanics, automotive technicians and painters typically use shop horses to rest car parts and the like thereon when performing automotive maintenance and painting services.

Shop horses are purchased from a retailer with a pad or cover already installed on the horizontal working surface. This cover protects the items placed on the stand during repair work so that no damage occurs to the item during the repair. Items that may be rested atop a shop horse range from light weight items, such as tools and small parts, to heavy weight items such as doors, fenders, hoods, and bumpers. The factory pads on the shop horses are typically one-half inch (½') thick or less and wear out within a few months or weeks, depending upon the level of work performed on the shop horse. These factory installed pads provide minimal protection and quickly disintegrate during ordinary working conditions. The disintegration of these factory installed foam pads produces dust particles which can become impregnated in wet paint and other coatings that are being applied to the item resting atop the shop horse. This type of pad may include an adhesive that is provided between the pad and the working potion of the tubing.

The disintegration of the original factory pads also requires the user to repair or replace the original pad. Previously, the shop horse was simply covered with rags, towels, and bubble wrap, collectively referred to as replacement items. These replacement items were intended to provide protection for the items placed on the shop horse after the pad begins to disintegrate. This is an ineffective repair which causes the constant replacement of these rags, towels and bubble wrap. Moreover, if the replacement items are not properly secured to the working portion of the tubing, they may cause damage to objects on which work is being performed by allowing them to slide or drop from the work horse.

BRIEF SUMMARY OF THE INVENTION

The present invention is a replacement pad that may be substituted for the original pad which comes on the shop horse/portable work bench and provides maximum protection for any items placed on the shop horse. The purchaser of the shop horse no longer has to create ways to cover the shop horse as the original cover disintegrates. The present invention does not produce dust particles and can be easily removed and replaced when it wears out.

In a preferred embodiment, the pad is cylindrical in shape and having a central radial opening provided therein. The pad is circular when taken in cross section and having a diameter that is approximately three inches (3") across. The axial length of the replacement shop horse pad is approximately thirty-one inches (31"). A central radial opening is provided through the shop horse pad. The central radial opening is in a range of approximately one to one and one-quarter inches (1"-1.25") in diameter. The pad includes an axial slit along the length of the pad that creates two axial edges. At least one strip of adhesive is arranged along one of the axial edges to create a seam of adhesive the seals the axial edges together. In the preferred embodiment, a strip of adhesive is provided along each of the axial edges. Covering strips, preferably of cellophane, are provided on one side of the strip(s) of adhesive opposite to the axial edge of the pad. In the preferred embodiment, a covering strip covers each strip of adhesive such that when the covering strips are removed, the strips of adhesive mate together causing the axial edges of the slit to be adhered together. In this manner the cover includes biasing a portion of the axial slit open by forcing one's fingers between it while applying pressure to an exterior side of the pad with the thumbs. After a portion of the axial slit near one end is forced open, the open portion is forced onto the horizontal portion of the tubing by pushing downwards with the thumbs. The entirety of the pad is forced onto the horizontal portion by beginning at one end and proceeding toward an opposite end thereof. The installer simply hooks his fingers on each hand around a respective side of the axial slit whilst pushing against an exterior side of the shop horse pad and slides his fingers the length of the central opening whilst pushing the pad down onto the horizontal portion of the tubing.

In this manner, a user may separate the axial edges and insert the axial slit onto the working portion of the tubing. Otherwise, the user simply forces the pad over the horizontal tubing of the shop horse and removes the covering strips from the adhesive. Thereafter, the axial edges of the pad are forced together to form a seam that comprises adhesive to create a solid pad about the exterior of the horizontal tubing. Preferably, the pad is closed cell foam. The pad may be provided in a variety of colors.

The method for replacing a shop horse pad includes removing the old shop horse pad. This is preferably achieved by running a sharpened edge, such as a hook-billed knife, along the axial length of the old pad and separating the pad from the underlying tubing that it surrounds. If an adhesive layer is provided between the old pad and the tubing, then it may be necessary to draw the sharpened edge along the axial length several times to shave the remnants of the old pad from the underlying tubing. Thereafter, the old pad is separated from the underlying tubing and a new pad is arranged around the tubing. The user grasps the new pad such that his fingers are inserted into the axial slit and his thumbs are on the exterior, opposite the slit, preferably at one end, and separates a portion of the opposing edges created by the axial slit. A portion of the tubing, preferably one end, is forced into the separated portion of the new pad. The user runs his fingers down the axial opening while his thumbs are maintained on an opposite side of the pad. The thumbs are used to force the pad onto the tubing. The adhesive strip cover is then removed from at least one side of the axial slit in the pad and the edges of the slit are forced together to seal the pad around the working portion of the tubing. When replacing the new pad, the user need only slit the pad in one axial direction and pull the pad from the tubing.

It is an object of the invention to provide a cylindrical pad for installation on a tubular horizontal member of a shop horse that is used as a work surface. The pad includes a central radial opening that runs the length of the pad. An axial slit running the length of the pad includes two edges that have at least one strip of adhesive deposited thereon to create a seam that includes adhesive such that the cylindrical pad may be secured to the tubular horizontal member.

It is another object of the invention to provide a method for replacing shop horse pads. The method includes providing a pad as mentioned above and separating the edges of the axial slit and thereafter forcing the tubular member between the edges and bringing the two edges together such that the adhesive securely fastens the pad about the tubular member.

These and other objects of the invention and advantages of the invention will be set forth, appear in part, or become apparent after considering the specification and accompanying drawings. It is to be realized that the following embodiments of the invention have been represented in their simplest form for ease in understanding the invention.

DETAILED DESCRIPTION OF THE INVENTION

The following is the preferred embodiment or best mode for carrying out the invention. It should be noted that this invention is not limited by the discussion of the preferred embodiment and should only be defined by the appended claims.

Figure 4:
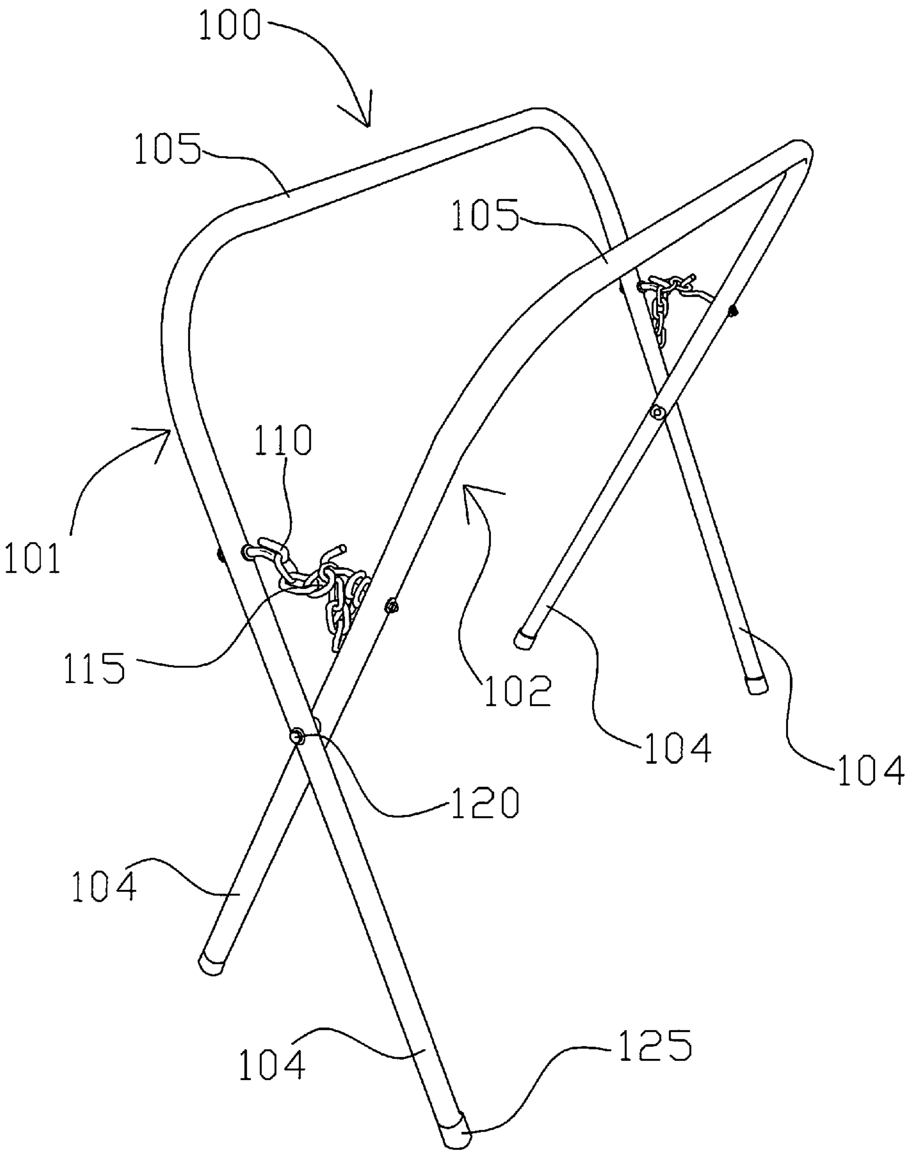
Prior Art Fig 4
FIG. 4 is a prior art shop horse.

FIG. 4 is a prior art shop horse 100. The shop horse 100 comprises a first u-shaped tube 101 and a second u-shaped tube 102 coupled together via a pivoting fastener 120 that secures the first and second tubes 101, 102 together such that the tubes may be collapsed when the work horse 100 is stored. The work horse is deployed by pulling the working horizontal portions 105 apart to separate the tipped feet 125. Each u-shaped tube 101, 102 include leg portions 104 arranged on opposite sides of the horizontal portions 105. A hook 110 is arranged in each leg 101, 102, preferably above the pivoting fastener 120. A chain 115 includes links that create a means for adjusting the distance between working portions 105. In this manner, the height of the shop horse may be varied according the number of links between each hook 110.

Figure 1A:
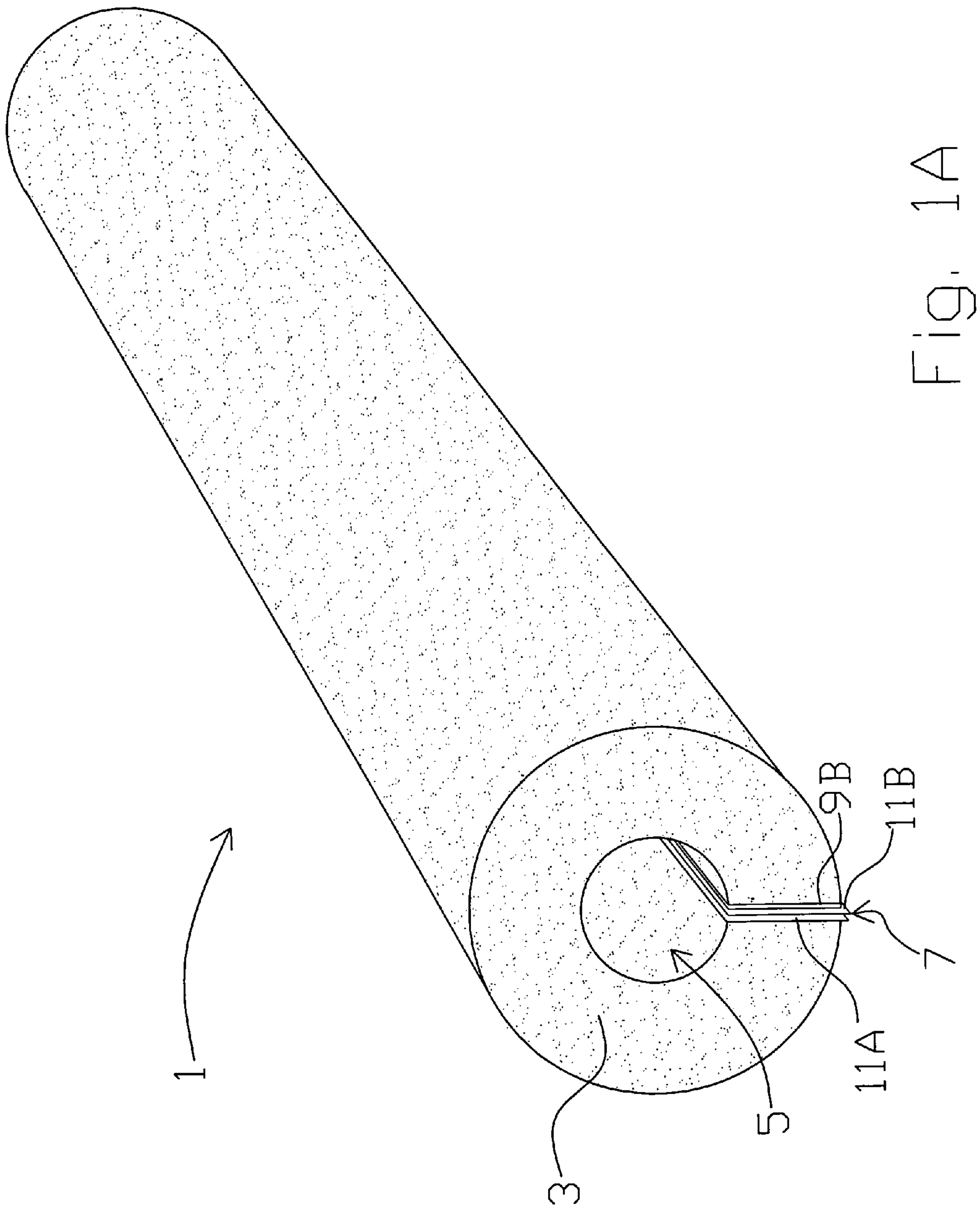
FIG. 1A is a perspective view of the shop horse pad.
Figure 1B:
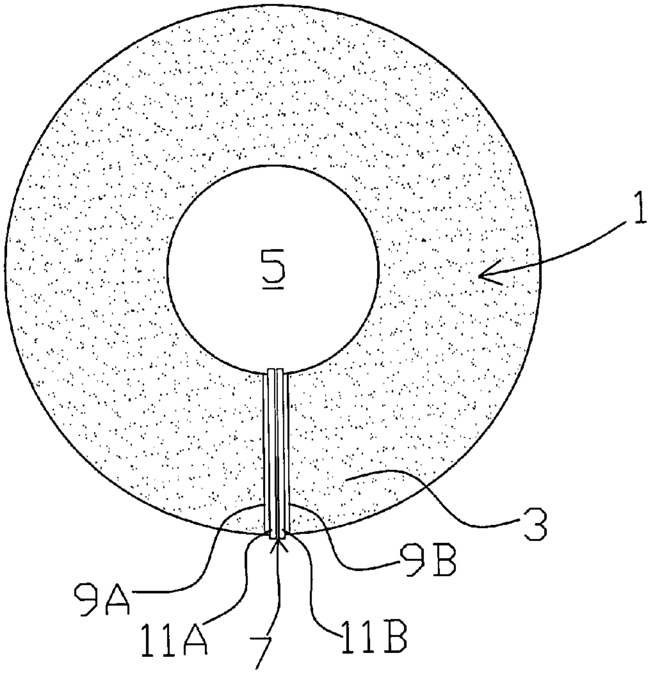
FIG. 1B is a plan view of the shop horse pad taken from an end and with overlays of protective material on the adhesive.
Figure 1C:
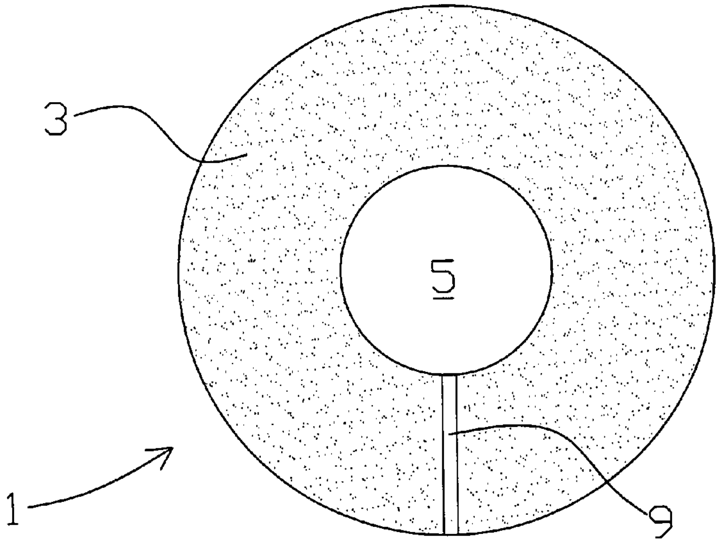
FIG. 1C shows a plan view of the shop horse pad with the overlays of protective material removed.
Figure 2:
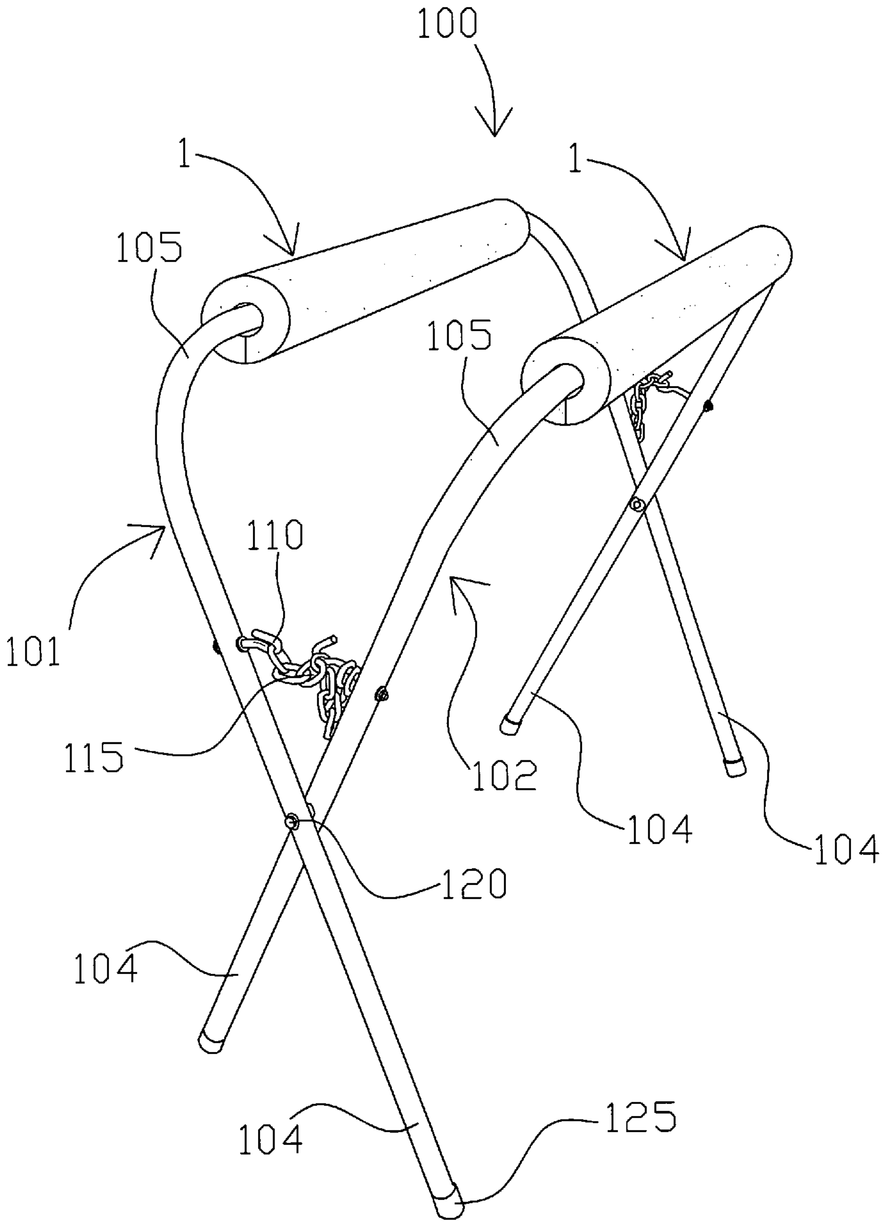
FIG. 2 is a perspective view of the shop horse pad installed on the working tube portion of the shop horse.

FIG. 1A is, a perspective view of the shop horse pad 1 that surrounds one of the working portions 105 as shown in FIG. 2. The shop horse pad 1 includes a cylindrically-shaped sidewall 3 that includes an axial opening 5 that extends from end to end within the sidewall 3. The sidewall 3 includes an axial slit 7 that extends on an exterior surface of the sidewall 3 to the axial opening 5 and along the entire length of the sidewall 3 to create a seam 10. As more clearly shown in the preferred embodiment of FIG. 1B, each side of the axial slit 7 includes a strip of adhesive 9A, 9B. The strip of adhesive may be double sided tape or the like that can be activated to seal the seam 10 after the shop horse pad 1 has been installed onto the shop horse 100. Each strip of adhesive 9A, 9B includes an overlay of protective material 11A, 11B that prevents the strips of adhesive from prematurely contacting one another. The overlays of protective material, 11A, 11B are removed to activate the strips of adhesive 9A, 9B. As shown in FIG. 1C, the overlays of protective material are removed and the strips of adhesive 9A, 9B, when activated, form a single seam of adhesive 9 that preferably runs the length of the axial opening 7. This single strip of adhesive 9 secures the respective pad 1 about the appropriate working portion 105, as shown in FIG. 2.

Figure 3A:
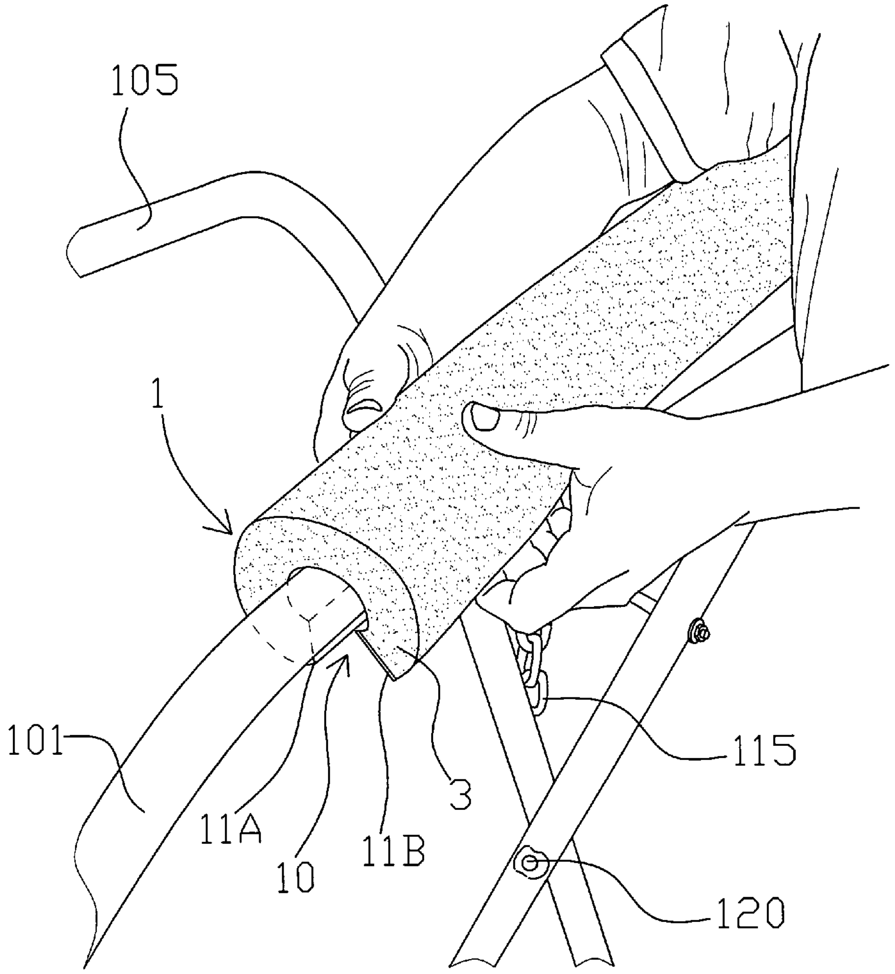
FIGS. 3A-3F are perspective views showing the method of installing the shop horse pad onto the shop horse.
Figure 3B:
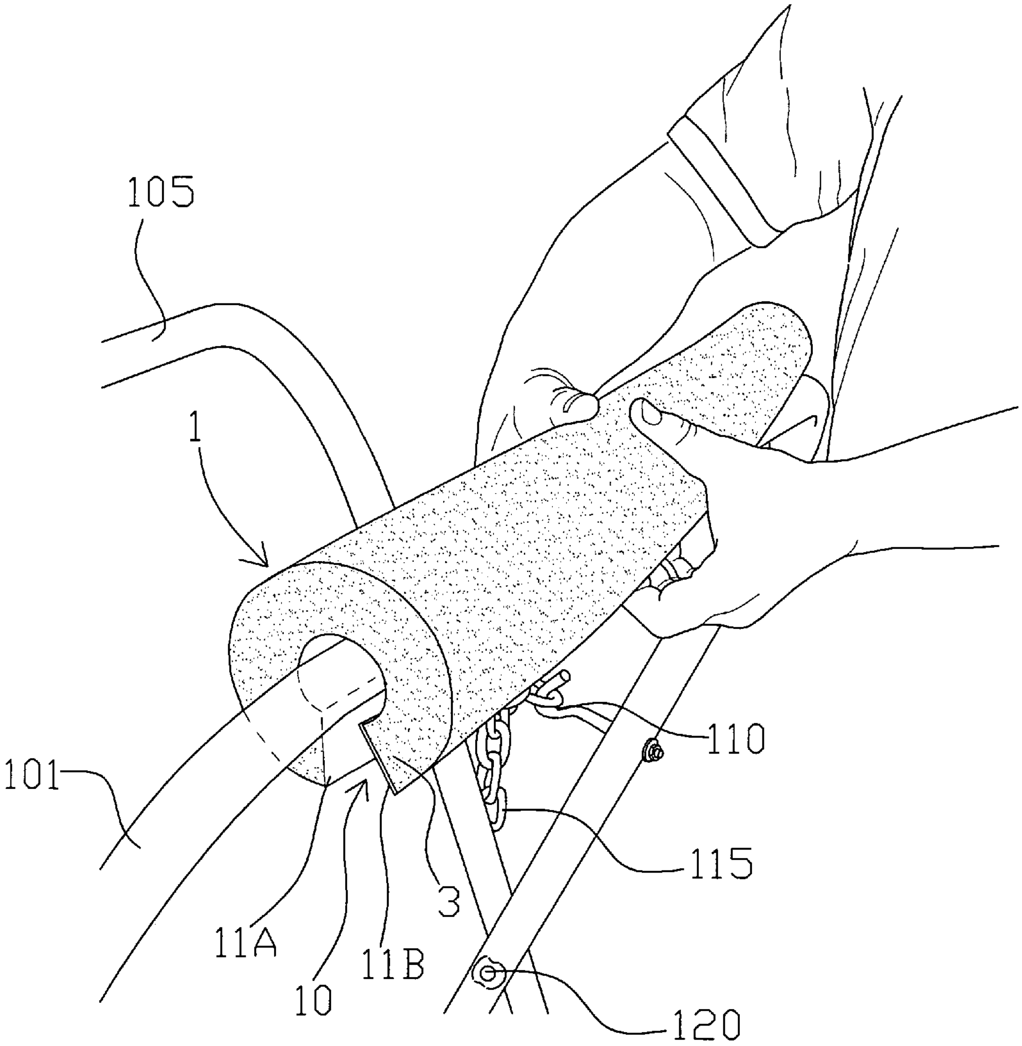
Figure 3C:
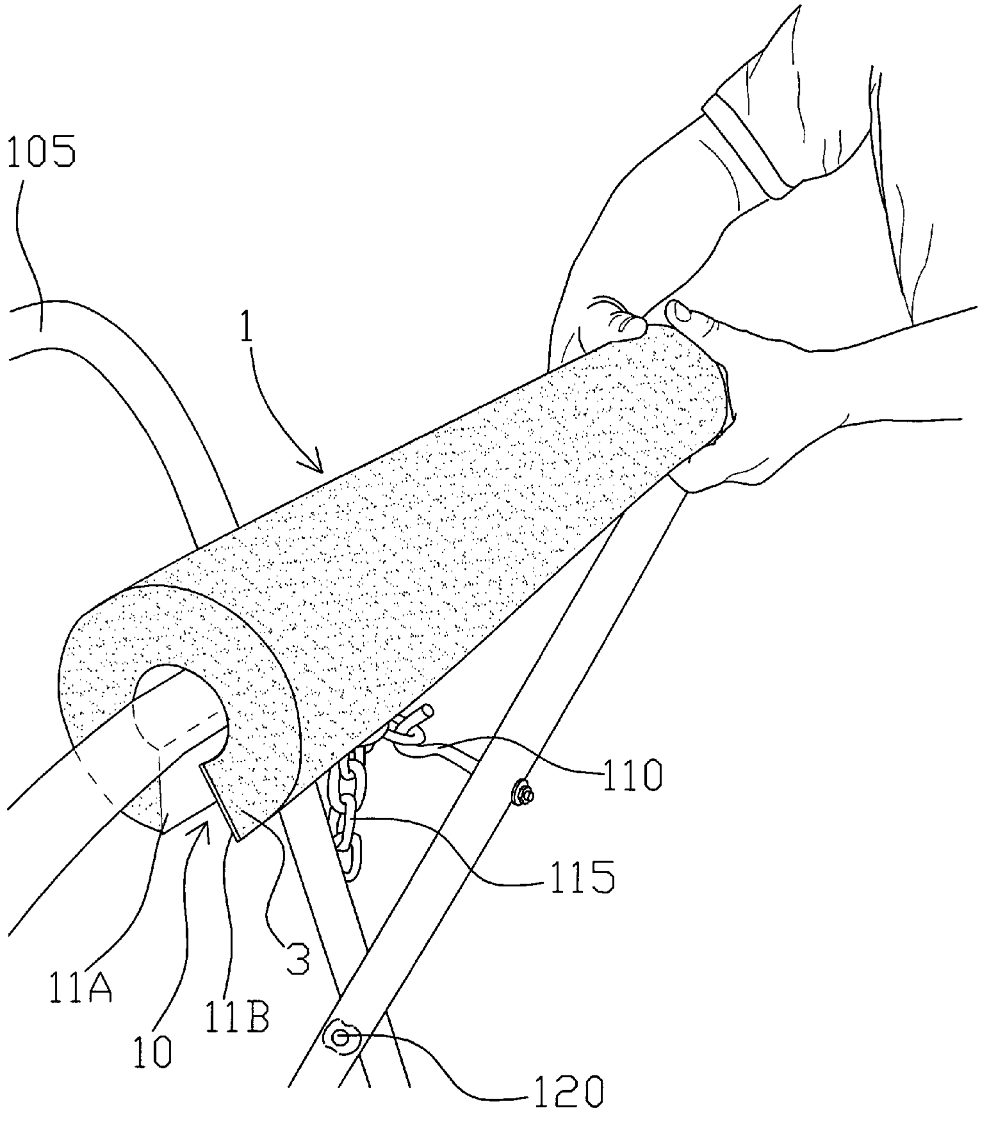

FIGS. 3A through 3F show a method for installing the shop horse pad onto a working portion of the shop horse. The shop horse is deployed into a working position, as shown in FIG. 2. The installer grasps the shop horse pad 1 at one end and separates the seam 10 as shown in FIG. 3A. Preferably, the fingers are forced into the seam 10 near one end of the shop horse pad 1, as shown in this figure. The finger tips on each hand are arranged inside the axial opening at an elevation lower than the thumbs, as shown. Force is exerted against the exterior of the sidewall via downward thumb pressure whilst the finger tips on each hand are rotated outward and upwards to separate the seam further. The open seam of the pad near the fingers is forced onto the working portion 105 of the shop horse 100. The installer may either slide his finger tips along the length of the axial opening 5 while continuing to force the remaining length of the shop horse pad 1 onto the working portion 105, as indicated in FIGS. 3B and 3C. Otherwise, the installer may force the seam 10 open near the center of the shop horse pad and slid his fingers toward the portion of the pad that is already on the working portion and thereafter repeat as necessary until the entire length of the shop horse pad is installed onto the shop horse 100 such that the working portion 105 is substantially covered by the shop horse pad 1.

Figure 3D:
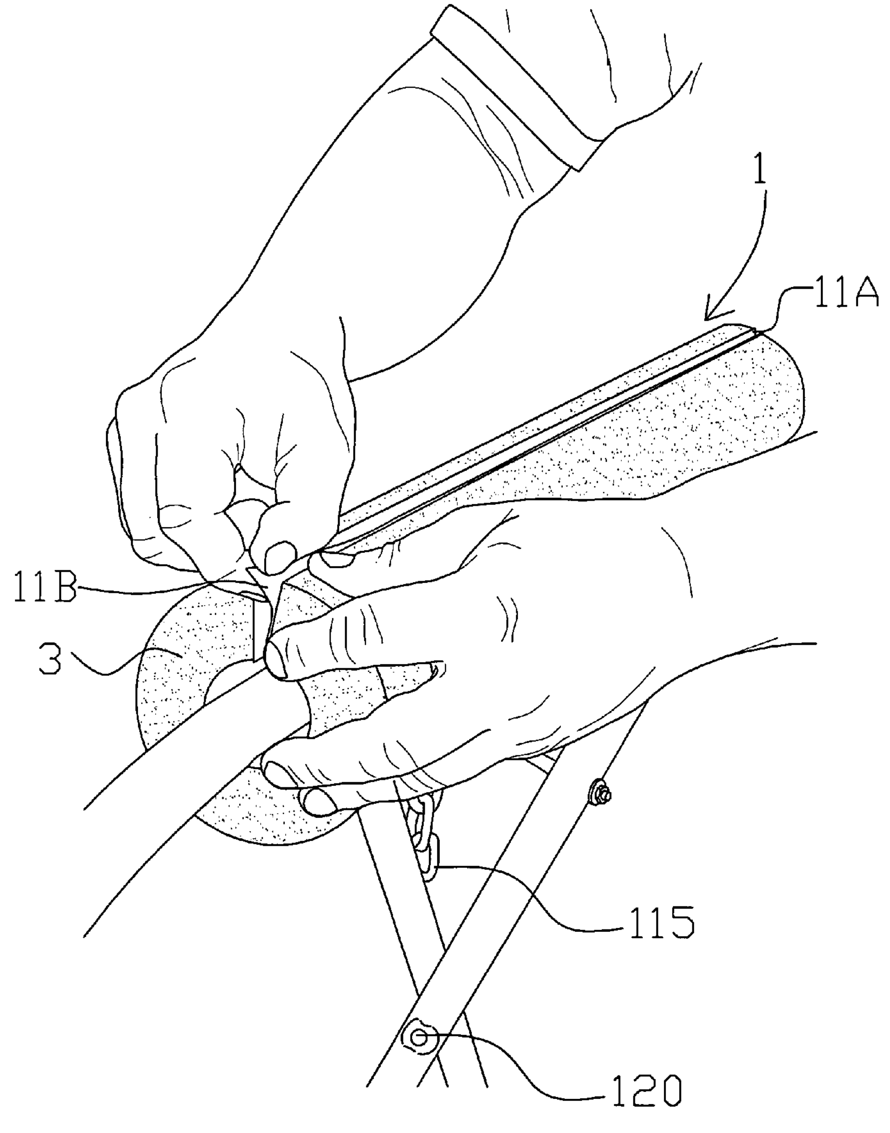
Figure 3E:
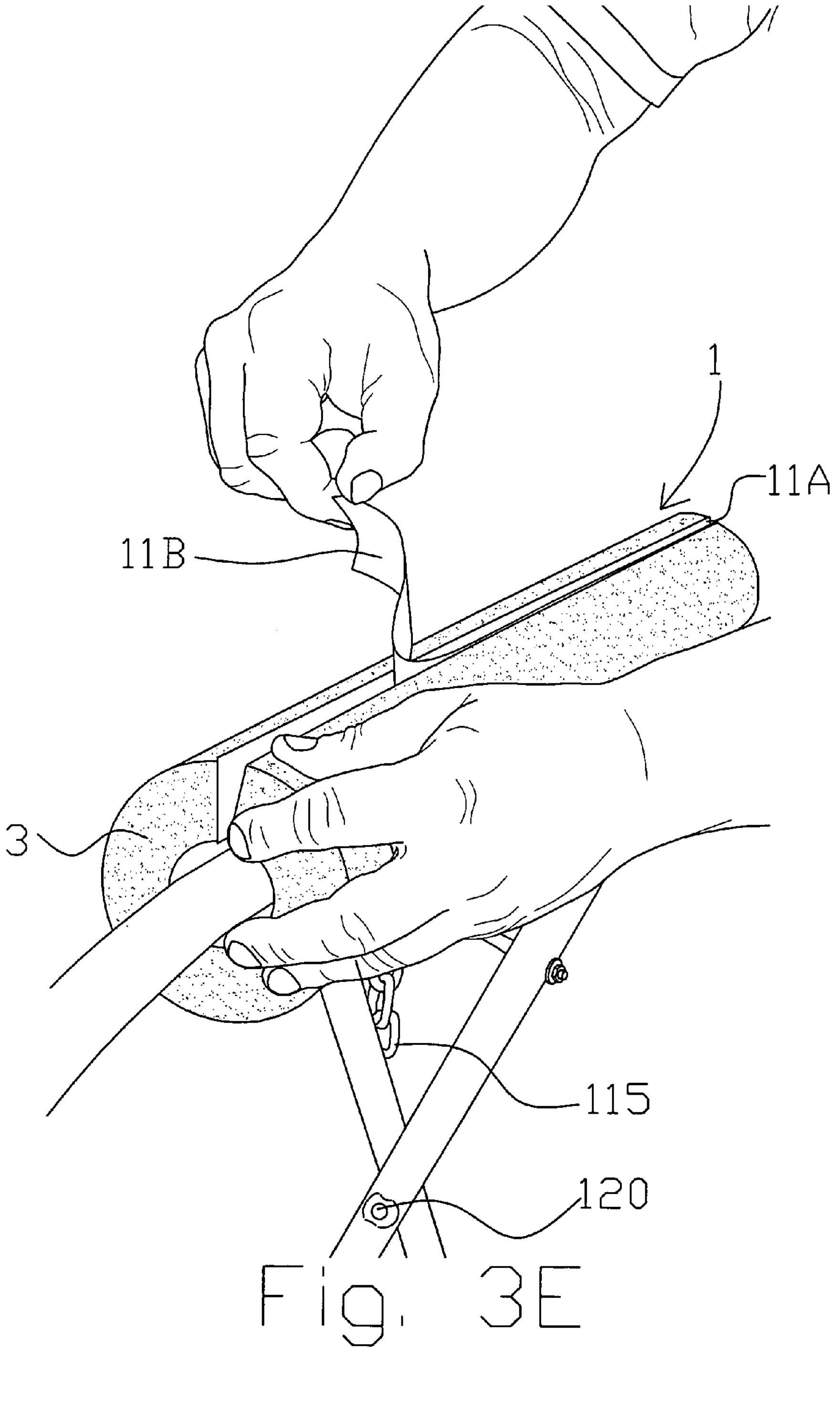
Figure 3F:
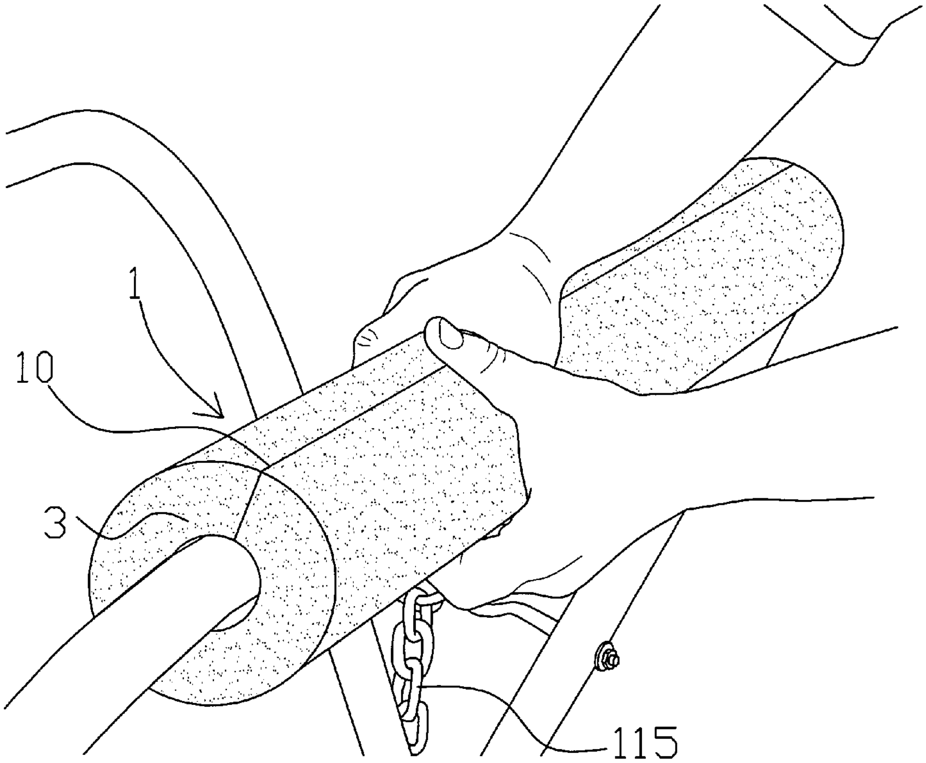

Next, the shop horse pad 1 is rotated about the working portion 105 such that the seam 10 is arranged substantially above the working portion 105, as shown in FIG. 3D. The overlay of protective material 11A is then removed from an underlying strip of adhesive by beginning at one end of the shop horse pad and pulling the protective material 11A from within adhesive arranged on opposite sides of the seam 10. If present, the protective material 11B is removed in this manner as well. Lastly, the seam 10 is forced together as shown in FIG. 3F and the seam is preferably rotated back to its position below the working portion as shown in FIGS. 3A-3C to avoid damage to the seam.

In the preferred embodiment, the shop horse pad 1 comprises a polyethylene closed cell foam. The sidewall of the shop horse pad is preferably one inch (1") thick from edge of the axial opening to the exterior, and can tolerate up to five hundred (500) pounds being placed upon it without causing damage to the pad. The shop horse pad 1 is substantially thirty-one inches (31") long and has a total diameter of from the center of the axial opening to the exterior of the sidewall of from three to three and one-quarter inches (3"-3.25"). The size is designed to cover the working portion of the shop horse. The closed cell composition does not produce dust particles. The foam pad is slit down the middle to allow for installation. Edges created by the slitting of the pad includes adhesive covered with cellophane strips which are removed when the pad is installed on the shop horse. These edges are closed to create a seamless cover when installed. The composition of the pad is superior to the lighter weighted three one-eights of an inch (3/8") or one-half inch (1/2) factory installed foam pad. The factory installed pads disintegrate within a short period of time and produce dust particles which can damage paint and other coatings.

As shown in FIGS. 1A and 1B, the pad is preferably thirty-one inches (31") long with a tolerance of +/−0.25%. The pad includes an overall diameter of three to three and one-quarter inches (3"-3.25") with a tolerance of +/−0.25%. A axial opening is a centrally located hole having a diameter of one and one-quarter inches (1 1/4%") with a tolerance of +/−1.125%. The shop horse pad comprises a sidewall wall thickness of one inch (1") with a tolerance of +/−0.120% closed cell foam. In the preferred embodiment, the pad includes an opening having a diameter of one and one-quarter an inch (1 1/4"). An outside diameter of the pad is preferably three and one-quarter inches (3.125") and the sidewall thickness is one inch (1"). The color is safety orange. The pad is slit down the middle to allow for installation. Cellophane strips, placed on the open edges of the pad, cover the glue along the length of the opening. The cellophane strips are removed when the pad is installed and the glue seals the pad.

Table 1 shows the preferred physical properties of the shop horse pad. The physical properties are listed in the left column. The preferred value is shown in the middle column and the test method for determining each is listed in the right column. The water absorption*1 is the determination of water absorption by sealant materials. The water absorption*2 is the standard specifications for cellular elastomeric preformed gasket and sealing material and is typically a historic standard measurement. In the preferred embodiment, the shop horse pad includes a fire retardant which meets or exceeds requirements of FMVSS302, ESA-M8G53-A, MS-AY 054a AND MS-AY554. The shop horse pad is an extruded round, closed-cell, low density polyethylene foam tube with a skin-lie outer texture. It is highly flexible and compressible for easy installation and available in a variety of colors.

TABLE 1

| PROPERTY | VALUE | TEST METHOD |
|---|---|---|
| Density (nominal) | 1.9 lbs.cu.ft. | ASTM-D-1622 |
| Tensile Strength | 50 PSI | ASTM-D-1623 |
| Compression Deflection | 5 PSI @ 25% | ASTM-D-1621 |
| Water Absorption*1 | 0.03 gm/cc | ASTM-C-1016 |
| Water Absorption*2 | 0.02% by volume | ASTM-C-509 |
| Temperature Range | −90 to +180 deg. F. | |

Tables 2 and 3 show UV and melt tests performed on samples of the shop horse pad. UV additives are included in the shop horse pads to prevent deterioration of the pads from sunlight. As indicated by these tables, the test conditions for determining the melting was performed at 190 degs. C on 2.16 kg of the test sample.

TABLE 2

| | | | Tolerance | | | |
|---|---|---|---|---|---|---|
| Item | Test Method | Specification | Condition | Precision | Units | Results |
| Quantitative UV Additive | ST411 | 7.00 | +/− | 3.00 | % | 5.18 |
| Quantitative UV Additive | ST411 | 17.00 | +/− | 2.00 | % | 18.18 |
| Melt Index | ASTM D1238 | 16.00 | +/− | 6.00 | g/10 min. | 17.87 |

Test Conditions: 190 C./2.16 kg

TABLE 3

| | | | Tolerance | | | |
|---|---|---|---|---|---|---|
| Item | Test Method | Specification | Condition | Precision | Units | Results |
| Quantitative UV Additive | ST411 | 7.00 | +/− | 3.00 | % | 6.69 |
| Quantitative UV Additive | ST411 | 17.00 | +/− | 2.00 | % | 17.85 |
| Melt Index | ASTM D1238 | 16.00 | +/− | 6.00 | g/10 min. | 16.24 |

Test Conditions: 190 C./2.16 kg

Table 4 shows strength test performed on samples of the shop horse pads. Strength tests were performed on five samples. The tensile strength of the samples ranged between 39 psi and 45 psi. Elongation of the materials was between 55 and 71 percent at the breaking point. The secant moduli ranged between 78 psi and 84 psi. The tangent moduli ranges between 70 psi and 83 psi.

TABLE 4

| Specimen No. | Tensile Strength (psi) | Elongation at Break (%) | Secant Moduli (psi) | Tangent Moduli (psi) |
|---|---|---|---|---|
| Specimen #1 | 42 | 60 | 80 | 75 |
| Specimen #2 | 44 | 71 | 78 | 82 |
| Specimen #3 | 45 | 63 | 84 | 83 |
| Specimen #4 | 39 | 55 | 79 | 70 |
| Specimen #5 | 42 | 61 | 78 | 75 |
| Median | 42 | 61 | 79 | 75 |
| Std. Dev. | 2.30 | 5.83 | 2.49 | 5.43 |

It is also to be understood that the invention is not limited to the exact construction illustrated and described above. Various changes and modifications may be made without departing from the spirit and the scope of the invention as defined in the following claims.

We claim:

1. A sacrificial, replaceable covering that encapsulates a working portion of tubing that comprises a shop horse, said covering comprising:

a cylindrically-shaped sidewall formed from closed cell foam that comprises a UV additive which prevents deterioration of said covering and further including flame resistant additives, said cylindrically-shaped sidewall having two ends, two edges, and an axial opening arranged within the sidewall, said two edges and the axial opening extending from one end of the cylindrically-shaped sidewall to the other end thereof, said axial opening being centrally located within the cylindrically-shaped sidewall;

an adhesive arranged between the two edges to form a seam that adheres the two edges together; and, a protective overlay arranged between said adhesive and one of the two edges.

2. The sacrificial, replaceable covering of claim 1 having a compression deflection of 5 PSI @ 25%.

3. The sacrificial, replaceable covering of claim 1 having water absorption of substantially 0.03 gm/cc.

4. The sacrificial, replaceable covering of claim 1 having water absorption of substantially 0.02% by volume.

5. The sacrificial, replaceable covering of claim 1 wherein an overall length of the cylindrical-shaped sidewall comprises a piece of closed-cell material that is substantially thirty-one inches in length and having a diameter within a range of between three to three and one-quarter inches (3"-3.25") and within a tolerance of +/−0.25% and the cylindrically-shaped sidewall thickness is substantially one inch (1") with a tolerance of +/−0.120% and the axial opening is a centrally located hole having a diameter of one and one-quarter inches (1¼") with a tolerance of +/−1.125%.

6. The sacrificial, replaceable covering of claim 1 having a range of elongation of substantially between 55 and 71 percent at a breaking point during a stretch test.

7. The sacrificial, replaceable covering of claim 1 having an operating range of between −90 deg. to +180 deg. F.

8. The sacrificial, replaceable covering of claim 1 having a secant moduli substantially ranging between 78 psi and 84 psi as measured during a strength test.

9. The sacrificial, replaceable covering of claim 1 having a tangent moduli substantially ranging between 70 psi and 83 psi as measured during a strength test.

10. The sacrificial, replaceable covering of claim 1 wherein said cylindrically-shaped sidewall having a density of 1.9 $lbs./ft^3$.

11. The sacrificial, replaceable covering of claim 1 wherein said cylindrically-shaped sidewall having a tensile strength of substantially between 39 psi and 50 psi.

12. A pad for a shop horse comprising:

a cylindrical piece of closed-cell material having a first end and a second end and including a UV additive which prevents deterioration of said pad and further including flame resistant additives which inhibit melting of said pad, said cylindrical piece of closed-cell material having an axial opening defined by a sidewall that extends from the first end to the second end and an axial slit arranged along an entire length of the sidewall to form opposing edges that are biased towards one another, said closed-cell material having a density of 1.9 $lbs./ft^3$ and having a tensile strength in a range of substantially between 39 psi and 50 psi;

an adhesive arranged along the axial slit; and, a strip cover that covers the adhesive such that the pad may be forced onto a working portion of a shop horse and the opposing edges of slit are adhered together.

13. The pad of claim 12 having a compression deflection of 5 PSI @ 25%.

14. The pad of claim 12 having water absorption of substantially 0.03 gm/cc.

15. The pad of claim 12 having water absorption of substantially 0.02% by volume.

16. The pad of claim 12 having a range of elongation of substantially between 55 and 71 percent at a breaking point during a stretch test.

17. The pad of claim 12 having an operating range of between −90 deg. to +180 deg. F.

18. The pad of claim 12 having a secant moduli substantially ranging between 78 psi and 84 psi as measured during a strength test.

19. The pad of claim 12 having a tangent moduli substantially ranging between 70 psi and 83 psi as measured during a strength test.

20. A sacrificial, replaceable covering that encapsulates a working portion of tubing that comprises a shop horse, said covering comprising:

a cylindrically-shaped sidewall formed from closed cell foam that comprises a UV additive which prevents deterioration of said covering and further including flame resistant additives, said cylindrically-shaped sidewall having two ends, two edges, and an axial opening arranged within the sidewall, said two edges and the axial opening extending from one end of the cylindrically-shaped sidewall to the other end thereof, said axial opening being centrally located within the cylindrically-shaped sidewall;

an adhesive arranged between the two edges to form a seam that adheres the two edges together; and, a protective overlay arranged between said adhesive and one of the two edges, wherein an overall length of the cylindrical-shaped sidewall comprises a piece of closed-cell material that is substantially thirty-one inches in length and having a diameter within a range of between three to three and one-quarter inches (3"-3.25") and within a tolerance of +/−0.25% and the cylindrically-shaped sidewall thickness is substantially one inch (1") with a tolerance of +/−0.120% and the axial opening is a centrally located hole having a diameter of one and one-quarter inches (1¼") with a tolerance of +/−1.125%.

* * * * *